US006697703B2

(12) United States Patent

Lopez

(10) Patent No.: US 6,697,703 B2
(45) Date of Patent: *Feb. 24, 2004

(54) METHOD AND APPARATUS FOR MULTI-TASK PROCESSING AND SORTING OF MIXED AND NON-MACHINABLE MAILPIECES AND RELATED METHODS

(75) Inventor: Steven W. Lopez, Orlando, FL (US)

(73) Assignee: Technology Solutions, Inc., Colorado Springs, CO (US)

(*) Notice: Subject to any disclaimer, the term of this patent is extended or adjusted under 35 U.S.C. 154(b) by 72 days.

This patent is subject to a terminal disclaimer.

(21) Appl. No.: 10/200,956

(22) Filed: Jul. 23, 2002

(65) Prior Publication Data

US 2003/0045945 A1 Mar. 6, 2003

Related U.S. Application Data

(63) Continuation of application No. 10/062,260, filed on Jan. 31, 2002.

(51) Int. Cl.[7] .................................................. G06K 9/00
(52) U.S. Cl. ........................ 700/224; 700/227; 209/584
(58) Field of Search ................................ 700/227, 228, 700/224, 225, 226; 209/586, 900

(56) References Cited

U.S. PATENT DOCUMENTS 4,641,753 A * 2/1987 Tamada ...................... 209/546
4,915,209 A * 4/1990 Canziani ..................... 198/357
4,992,649 A * 2/1991 Mampe et al. .............. 209/546
5,142,482 A * 8/1992 Sansone ..................... 700/221
5,422,821 A 6/1995 Allen et al.
5,703,783 A 12/1997 Allen et al.
6,508,365 B1 * 1/2003 Cacace-Bailey et al. .... 209/584
6,510,992 B2 * 1/2003 Wells et al. ................ 235/385

OTHER PUBLICATIONS

Brochure of Technology Solutions International, Inc. for TSI Double Label Retrofit for the LMLM 400.

* cited by examiner

*Primary Examiner*—Leo Picard
*Assistant Examiner*—Kidest Bahta
(74) *Attorney, Agent, or Firm*—Bracewell & Patterson, LLP

(57) ABSTRACT

An apparatus for performing multiple and varied processing and sorting procedures on mixed mailpieces of varied sizes in a single pass is provided. The apparatus further provides a user interface so that as few as a single user can perform the multi-task processing and sorting of mixed and non-machineable mailpieces. Also provided are related methods for performing in a single pass with as few as a single operator multiple processing and sorting steps on mixed mailpieces primarily with the purpose of rehabilitating and improving the characteristics of the mailpieces for the purpose of subsequent high speed processing.

20 Claims, 10 Drawing Sheets

METHOD AND APPARATUS FOR MULTI-TASK PROCESSING AND SORTING OF MIXED AND NON-MACHINABLE MAILPIECES AND RELATED METHODS

RELATED APPLICATIONS

This application is a continuation of U.S. patent application Ser. No. 10/062,260, filed Jan. 31, 2002, titled Method and Apparatus for Multi-Task Processing and Sorting of Mixed and Non-Machinable Mailpieces and Related Methods, which is incorporated herein by reference in its entirety.

FIELD OF THE INVENTION

The present invention relates to the field of mail processing systems. More particularly, the present invention relates to performing multiple processing and sorting tasks on mixed and non-machineable mailpieces and the ability to rehabilitate and improve the characteristics of mailpieces for the purpose of subsequent processing.

BACKGROUND OF THE INVENTION

Mailpiece processing generally involves multiple tasks. These disparate tasks are dictated by whether, for example, the particular mailpieces are properly addressed, whether the mail piece addresses are machine readable, whether the mailpiece has be properly routed up to the point of processing. Thus, one task involves identifying and processing improperly addressed mailpieces, which, of course, must be processed differently than other mailpieces. Mailpieces lacking machine readable addresses, too, will have to be processed separately. Usually, with current mailpiece processing equipment, such items of necessity are processed and sorted manually off-line. Other tasks are intended to provide a valuable service to mail service users but also complicate the mail service providers processing and sorting procedures. Such services include forwarding address routing of mailpieces and, sometimes, providing notice to the sender when a mailpiece is forwarded. Other tasks include processing certified mail or postage due mail and properly allocating the charges associated with such mail.

It follows that a mail service provider such as the United States Postal Service is responsible for myriad activities beyond simply accepting, sorting, and delivering individual mailpieces. There are many unique services involved with the postal activities of a mail service provider such as returning mail to the sender, uniquely handling of certified or postage due mail. Additionally, there are many processes that are unique to the internal processing of the mail that is intended to correct previous errors and/or reduce processing costs such as re-directing mis-sent mail, tabbing open mail so as to make "machineable", placing a clean label over extraneous printing or a bad bar code for subsequent automated processing, facing random oriented mail, and machine sorting of non-machine readable mail.

More specifically, the existing sorting equipment does not have the ability to rehabilitate or improve a mailpiece, in a single operation, that is designated for manual processing means whereby it can be subsequently processed on standard high speed automation equipment.

Conventional mail processors and sorters are limited to performing a particular, narrow function. Primarily due to economic reasons, however, conventional high-volume devices have had to be limited to a single designated task. For example, a typical application involves scanning a letter-sized mailpieces for the purpose of reading each mailpiece's address indicators, barcoding the mailpieces, and subsequently sorting them. Other distinct devices or manual effort are needed to perform different processing tasks.

While conventional technology is limited in requiring different devices for distinct processing and sorting tasks, the technology is further limited in the sense of requiring different devices for different types of mailpieces. A separate machine, for example, is necessary to handle the larger size flats, due to the different size of the scanner, sort bins, and feed rates. Although equipment recently has been developed that will sort a wider range of mail piece sizes, such as letter-sized and flat-sized mailpieces together, these devices remain limited to performing a single, distinct function. Such is the case with both Siemens MMS I-Sort machine, Lockheed-Martin's ST3000 and MailCode's Olympus Sorter mentioned above. This equipment has typically been limited to reading and sorting mixed mail based on the postal address.

Thus, the conventional technology is limited in failing to provide a unified multi-task, mixed mailpiece processing and sorting device capable of performing multiple processing and sorting tasks on differently sized mailpieces. An even more important, more fundamental limitation of these conventional devices, however, is that none provide an interface between a processor/sorter and the user that can be under the unified control of as few as a single user. An even more important, limitation of these conventional devices, however, is that none provide a capability to improve the machineability of the mailpiece in a single processing operation.

Accordingly, there is a need for a multitask, mixed mailpiece processor and sorter that automates not some but all of the processing and sorting tasks needed for efficient mail handling, that makes each of the tasks performable on not some but most all sized mailpieces, and that not only brings these capabilities into a single, unified device but also provides a user interface for controlling each of the disparate tasks.

SUMMARY OF THE INVENTION

With the foregoing in mind, the present invention advantageously provides an apparatus and related methods for performing multiple processing and sorting tasks. The tasks each are to be performed at a predetermined speed for first-sized mailpieces (e.g., letter-sized mailpieces) and at a second predetermined speed for second-sized mailpieces (e.g., flat-sized mailpieces) so that the plurality of mailpieces including both first- and second-sized mailpieces is processed and sorted in a single pass. Mixed mailpieces thus need not be segregated into same-size groups. The same methods can be performed on the same apparatus in a single pass rather than on different machines or in separate, distinct passes. This function adds value when the LISPS goes to a single environment to DPS (Delivery Point Sequence) Mail in one container so that the carrier does not need to spend additional time in his day "casing" (i.e. putting all different mail volumes in his route order) by hand.

Therefore, a mail handling facility no longer need have multiple machines arrayed at various locations throughout the facility's mailpiece processing area. Instead, a single apparatus according to the present invention may be utilized for accomplishing each of the various tasks necessary for complete and efficient handling of mailpieces. Moreover, there is no need to run one pass with a same-size group and then stop the apparatus and re-tool before processing and sorting another same-size group of mailpieces. The apparatus and methods accordingly provide major advantages. Among these is the reduced footprint of processing and sorting equipment situated in the mail handling facility. Another is the elimination of downtime that occurs when an apparatus must be re-tooled before being able to perform different processing and sorting functions. Moreover, by reducing the necessary operators to as few as a single user, a considerable reduction in labor expenses is achieved with the present invention.

Specifically, the present invention provides a multi-task mixed mailpiece processor and sorter capable of processing and sorting differently sized mailpieces including letters and flats in a single pass under the control of as few as a single user. More specifically the multi-task mixed mailpiece processor and sorter according to the present invention includes a mailpiece feeder to individually feed a plurality of mailpieces of varies sizes to a variable-speed mailpiece transporter that transports each received mailpiece. A mailpiece scanner is positioned downstream from the mailpiece feeder and adjacent the mailpiece transporter to scan each mailpiece for any mail handling indicia that may be positioned on a mailpiece such as recipient address, sender address, identification code, and post code.

The apparatus further includes a user interface that preferably has a visual display terminal possibly a touch screen to make entries easier to permit the input of commands by a user and to provide to the user visual images of mail handling indicia positioned on each mailpiece. A printer is also included for printing on a mailpiece or on a label or a tab positioned on the mailpiece. Also included is at least one mailpiece sorting bin for receiving processed mail according to the sorting procedures effected as a result of optimal processing.

A process controller is also included. Preferably, the process controller includes an optical character reader. The process controller also preferably includes a transport speed control processor responsive to the mailpiece size determiner to control the speed at which mailpieces are transported by the mailpiece transporter so that different sized mail is transported at different speeds so as to permit mixed mailpiece processing and sorting. The process controller also includes a sorting processor responsive to mail handling indicia scanned by the mailpiece scanner. Specifically, in response to various indicia, the sorting processor causes an image to be displayed on the visual display terminal and an identification code to be printed by the printer on a mailpiece when the mailpiece is devoid of at least one address indicator readable by the optical character reader. The sorting processor responds to such an indicator code by causing the printer to print a postnet code on a mailpiece, the postnet code corresponding to a correct sortation or deliver indicator (e.g., recipient address) to facilitate sorting and subsequent delivery of the mailpiece.

Preferably, the multi-task mixed mailpiece processor and sorter is further responsive to mail handling indicia scanned by the mailpiece scanner, responding by causing the mailpiece transporter to transport a mailpiece to the mailpiece feeder to be re-fed thereto for further processing when an indicator code has been printed by the printer on the mailpiece but before any post code has not been printed it. Preferably, the sorting processor also responds to mail handling indicia scanned by the mailpiece scanner so as to cause the printer to print a post code on a mailpiece and the mailpiece transporter to transport the mailpiece to the out-of-scheme (Read reject) bin when the mailpiece has included as part of its mail handling indicia an out-of-zone address code, defined as one not corresponding to the geographic zone within which the mailpiece is being processed.

The multi-task mixed mailpiece processor and sorter preferably further includes a return-to-sender processor capable of processing a mailpiece that is to be returned to the mailpiece sender. Specifically, the return-to-sender processor is preferably responsive to mail handling indicia scanned by the mailpiece scanner or operator input so as to cause an address code to be printed on the mailpiece by the printer wherein the address code corresponds to the address of the sender and the mailpiece to be transported by the transporter to a carrier bin for subsequent delivery of the mailpiece to a correct recipient. The printer will also print the reason for return as indicated by the operator.

Preferably the multi-task mixed mailpiece processor and sorter further includes a dead-letter processor responsive to mail handling indicia scanned by the mailpiece scanner to identify a mailpiece not otherwise deliverable to a correct addresses and also not returnable to a sender. The dead-letter processor responds by causing the mailpiece to be transported by the mailpiece transporter to a dead-letter bin.

The multi-task mixed mailpiece processor and sorter also preferably includes an accountable mail processor responsive to a postage-due indicator so as to identify a mailpiece for which a pre-selected amount of postage is due. In response, the accountable mail processor causes a postage-due marker to be printed on the mailpiece. Moreover, the multi-task mixed mailpiece processor and sorter preferably also includes a memory to which the accountable mail processor is adapted to write a tabulated postage due result to the memory.

According to the present invention, the multi-task mixed mailpiece processor and sorter preferably includes a mis-sent letter processor. Whenever the mail handling indicia positioned on a mailpiece includes an earlier applied postnet code, defining a first postnet code, a subsequently applied postnet code, defining a second postnet code, the mis-sent letter processor compares the second postnet code to the first code to determine whether the second postnet code is identical to the first code.' If the two are substantially identical, the mis-sent letter processor causes the mailpiece to be transported by the mailpiece transporter to a loop-mail bin.

The multi-task mixed mailpiece processor and sorter preferably also includes a look-up address database stored in the memory and containing mailpiece recipient addresses. According to the present invention, a user preferably can select a mailpiece recipient address contained in the look-up address database and cause the printer to print on the mailpiece a recipient address selected from the look-up database in response to a command provided by the user via the user interface.

Preferably, the multi-task mixed mailpiece processor and sorter also preferably further includes in memory a mailpiece status database containing data indicators corresponding to pre-selected status designators, each status designator designating the processing status of a particular mailpiece. The process controller then preferably includes a mailpiece tracker processor in communication with the memory and with the scanner to identify a status designator positioned on a mailpiece.

Another preferred feature of the multi-task mixed mailpiece processor and sorter is a tabber or labeler or combination labeler-tabber in communication with the user interface and positioned downstream from the mailpiece scanner and adjacent the mailpiece transporter to selectively tab a mailpiece in response to a command provided by the user via the user interface and to label a mailpiece. Moreover, the combination labeler-tabber also is further preferably responsive to mail handling indicia scanned by the mailpiece scanner, responding by labeling a mailpiece when the mailpiece is devoid of a clear zone for the printing of a postnet code on the mailpiece. Once the label is applied, the postnet code can be printed on the label. Furthermore, the combination labeler-tabber preferably is also positioned in communication with the mailpiece size determiner and is adapted to tab a first-sized mailpiece with a first-sized tab and a second-sized mailpiece with a second-sized tab in response to a mailpiece size determination made by the mailpiece size determiner or in response to a command provided by the user via the user interface.

The present invention further provides methods of performing multiple processing and sorting tasks on individual mailpieces of a plurality of mixed mailpieces of different sizes. According to the present invention, the method includes determining from an electrical scan of each of the plurality of mailpieces whether one or more mailpieces lacks mail handling indicia positioned on the mailpieces for effecting delivery of each mailpiece to a correct mailpiece recipient. When the mailpiece lacks such indicia, a visual image of the mailpiece is generated at the visual display terminal. The mailpiece is then marked with an indicator code. More preferably, each of the steps of the method is performed at a first speed for first-sized mailpieces and at a second speed for second-sized mailpieces so that the plurality of mailpieces including both first- and second-sized mailpieces is processed and sorted in a single pass.

According to the method of the present invention, a mailpiece meeting the criteria established for delivery sequence processing which includes a usable eleven digit postnet barcode and machineability criteria including size, shape, rigidity standards, thickness standards, and shear resistance characteristics. More preferably, the mailpiece meeting the criteria is sorted to one or more bins designated for subsequent high speed automated processing.

According to the method of the present invention, a mailpiece having an indicator code is subsequently processed and a postnet code is printed on the mailpiece, the postnet code corresponding to a mail handling indicator based on which of the mailpiece can be properly sorted. The method preferably also includes sorting a mailpiece to an out-of-scheme(Read reject) bin when the mailpiece has positioned thereon an out-of-zone address code, an out-of-zone address -ode being defined as one not corresponding to the geographic zone within which the mailpiece is being processed. Also according to the present invention, the method preferably includes sorting the mailpiece to 3 carrier bin in response to a return-to-sender indicator positioned on the mailpiece.

According to the present invention, the method preferably further comprises determining from the electrical scan whether at least two attempts have been made to deliver a mailpiece and sorting the mailpiece to a dead-letter bin when both deliveries were according to identical mail handling indicia applied to the mailpiece at different times. The method according to the present invention preferably also includes tabulating the postage-due for each mailpiece having positioned thereon a postage due indicator. Misdirected mail is preferably processed according to the present invention by comparing a subsequently applied postnet code to an earlier applied one. When the two are substantially the same, the mailpiece is sorted to a loop-mail bin. The method preferably includes selectively tabbing a mailpiece with a combination labeler-tabber or just tabber in response to a command provided by the user via the user interface.

The method preferably further comprises causing the labeler-tabber or just labeler to label a mailpiece when the mailpiece is devoid of a clear zone for the printing of a postnet code on the mailpiece. The method also preferably includes tabbing a first-sized mailpiece with a tab having a first size defining a first-sized tab and a tabbing a second-sized mailpiece by a tab having a second size defining a second-sized tab in response to a mailpiece size determination made by a least one sensor.

Thus, the apparatus and methods of the present invention provide a unified multi-task, mixed mailpiece processing and sorting device capable of performing multiple processing and sorting tasks on differently sized mailpieces. Moreover, the apparatus and methods provide a critical interface with a user so that processing and sorting of mixed mailpieces can be performed under the unified control of as few as a single user. Accordingly,-the present invention provides a multi-task, mixed mailpiece processor and sorter that automates not some but all of the processing and sorting tasks needed for efficient mail handling. The present invention, moreover, makes each of the tasks performable on not some but most all sized mailpieces. Not only does the present invention provides these unique advantage, it brings these capabilities into a single, unified device that includes a user interface for enabling as few as a single user to control each of the disparate processing and sorting tasks.

BRIEF DESCRIPTION OF THE DRAWINGS

Some of the features, advantages, and benefits of the present invention having been stated, others will become apparent as the description proceeds when taken in conjunction with the accompanying drawings in which.

DETAILED DESCRIPTION

The present invention will now be described more fully hereinafter with reference to the accompanying drawings which illustrate preferred embodiments of the invention. This invention, however, may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout. The prime notation, if used, indicates similar elements in alternative embodiments.

Figure 1:
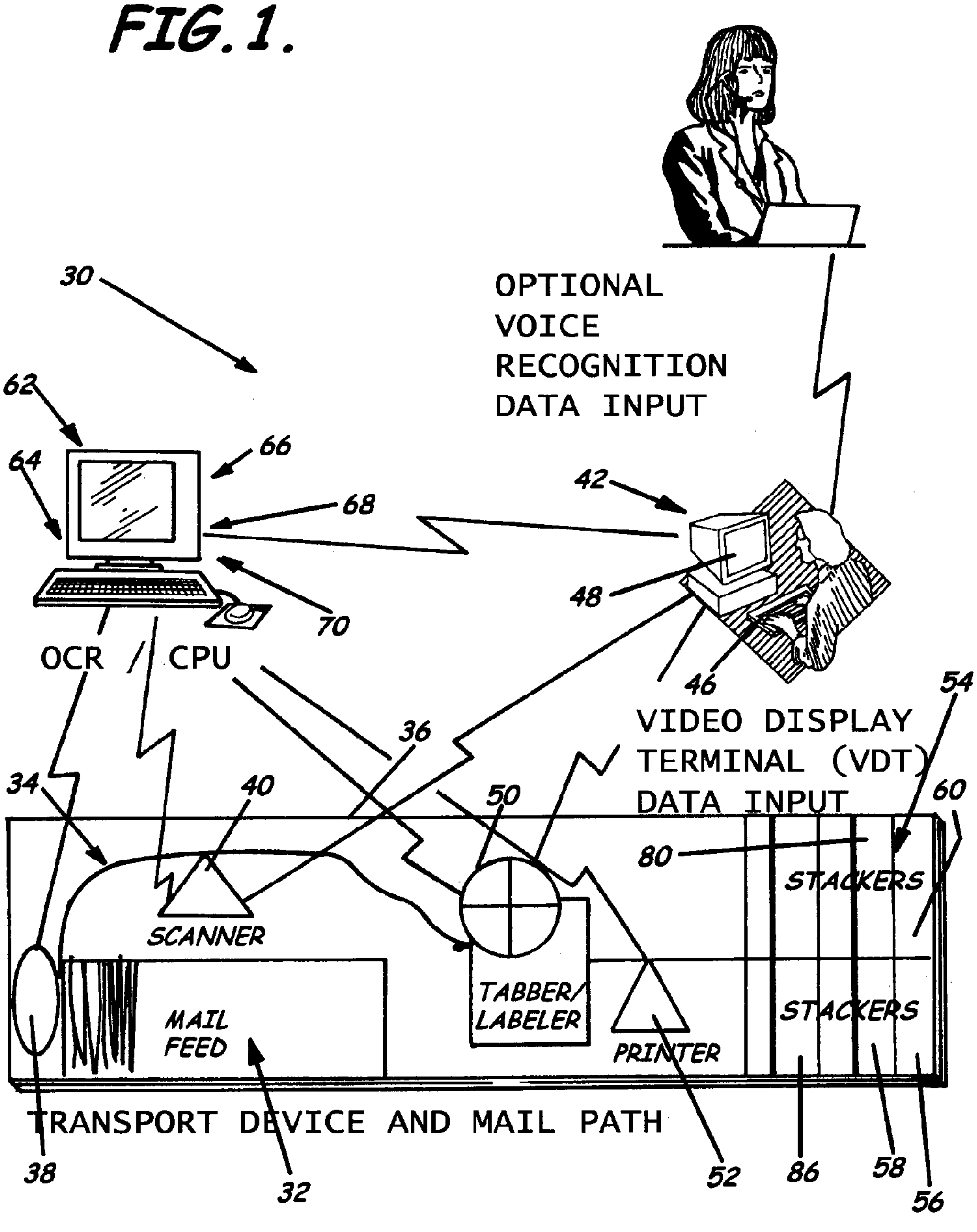
FIG. 1 is a schematic view of a multi-task mixed mailpiece processor and sorter according to the present invention.

FIG. 1 illustrates a multi-task mixed mailpiece processor and sorter 30 for processing and sorting differently sized mailpieces according to the present invention. Specifically, the differently sized mailpieces include letter-sized mailpieces and flats as both terms are understood by those skilled in the art. More specifically, the multi-task mixed mailpiece processor and sorter 30 preferably feeds mailpieces, scans them, processes each according to one or more multiple procedures, and sorts them preferably in a' single pass under the control of as few as a single person. Various processing and sorting tasks, specifically, are performed on mailpieces that can typically range from three and one-half by five square-inch letters (3.5"×5") of varying thickness to ten by fourteen square-inch flats (10"×14") also of varying thickness. Some mailpieces processed and sorted according to the present invention using the multi-task mixed mailpiece processor and sorter 30 may even be smaller than five square-inch letters (3.5"×5") of varying thickness, while others may be larger than ten by fourteen square-inch flats (10"×14") also of varying thickness. As explained, below, the present invention further provides additional features for processing mailpieces having unique characteristics (e.g., bulk mail).

At least some of the mailpieces to be processed and sorted by the multi-task mixed mailpiece processor and sorter 30 are marked with mail handling indicia. Mail handling indicia ordinarily includes at least the mailing address of the intended recipient of the mailpiece (i.e., a recipient address) and frequently includes the return address of the sender (i.e., a sender address). In addition to recipient addresses and sender addresses, mail handling indicia can also include various coded indicators such as the familiar "zip codes" and "Planetcodes" used by the United States Postal Service (USPS). As described herein, mail handling indicia includes post codes broadly defined to include any indicia used to facilitate mail handling. As explained more fully below, such indicia also specifically includes an identification code applied by the user of the multitask mixed mailpiece processor and sorter 30 for a specific processing task of a particular mailpiece.

As illustrated in FIG. 1, the multi-task mixed mailpiece processor and sorter 30 includes a mailpiece feeder 32 that individually feeds a plurality of mailpieces, including at least mailpieces of a first size defining, first-sized mailpieces (e.g., letter-sized mailpieces) and mailpieces of a second size defining second-sized mailpieces (e.g., flats).

The multi-task mixed mailpiece processor and sorter 30 also includes a mailpiece transporter 34 to transport varied size mailpieces along a pre-selected path of travel 36. Preferably, the mailpiece transporter 34 transport mailpieces at different speeds so as to constitute a variable-speed mailpiece transporter. As also illustrated in FIG. 1, the mailpiece transporter 34 is preferably positioned adjacent the mailpiece feeder 32 so as to receive each of the plurality of mailpieces from the mailpiece feeder 32 and to transport each received mailpiece therefrom along the predetermined path of travel 36. As already noted the mailpiece transporter 34 is preferably a variable-speed mailpiece transporter and, therefore, selectively transports some mailpieces at a first speed and other mailpieces at a second speed. More preferably, smaller sized mailpieces are transported at higher speeds than larger sized one in accordance with the processing speed of a scanner 38 that, as explained below, is a further feature of the multi-task mixed mailpiece processor and sorter 30.

In order to control the speed of travel of mailpieces along the path 36 of the variable-speed transporter 34 in accordance with the size of each mailpiece, the multi-task mixed mailpiece processor and sorter 30 preferably further includes a mailpiece size determiner 38 positioned adjacent the mailpiece feeder 32 and mailpiece transporter 34 to thereby determine the size of each of the plurality of mailpieces fed via the feeder 32.

Further according to the present invention the multi-task mixed mailpiece processor and sorter 30 also includes a mailpiece scanner 40 preferably positioned downstream from the mailpiece feeder 32 and adjacent the mailpiece transporter 34 to scan each mailpiece. More specifically, the mailpiece scanner 40 preferably scans each mailpiece for a recipient address, a sender address, an identification code, Planetcode and/or postnet code that can be positioned)n any of the mailpieces undergoing processing and sorting with the multi-task mixed mailpiece processor and sorter 30. Preferably, the scanner 38 is selected to have a scanning capability sufficient to scan images from mailpieces as large as the typical flat (i.e., ten inches in height by fourteen inches, in width (10"×14"). The scanner 38 preferably is capable of omni-directionally scanning mailpieces so as to be able to read mail handling indicia the form of bar codes in any horizontal or vertical orientation.

As illustrated in FIG. 1, the multi-task mixed mailpiece processor and sorter 30 preferably includes as well a user interface 42, the user interface 42 preferably including a visual display terminal 44 positioned in communication with the mailpiece scanner. The user interface 42 permits the user to input commands while providing the user visual images of mail handling indicia positioned on the mailpieces. More specifically, as will be readily understood by those skilled in the art, the user interface can include a keyboard 46 and/or a menu screen 48 having "touch-screen" capabilities to enable the user to input commands. User commands also can be input by voice if optional voice recognition capabilities as understood by those skilled in the are included as part of the user interface 42.

The multi-task mixed mailpiece processor and sorter 30, again, as best illustrated in FIG. 1, preferably also includes a combination labeler-tabber or each component used separately 50 in communication with the user interface 42 and positioned downstream from the mailpiece scanner and adjacent the mailpiece transporter. The labeler-tabber 50, according to the present invention, selectively tabs a mailpiece in response to a command provided by the user via the user interface 42 and labels a mailpiece. Preferably, the combination labeler-tabber, according to the present invention, can both label and tab the same, individual mailpiece or act as one function or the other independently of each other. More preferably, the labeler-tabber 50 is able to apply a label to the face of a mailpiece simultaneously as the labeler-tabber 50 applies a tab along an edge of the mailpiece.

The labeler of the labeler-tabber 50 preferably is adapted to position a label on the face of a mailpiece and cause the label to be wrapped around the right edge to the back of the mailpiece, the extent of the label having a pre-selected length. The label, moreover, according to the present invention, thus can further function as a tab. The tabber of the labeler-tabber 50 preferably is responsive to a user command and is capable of placing a tab on the right edge of a mailpiece, the position be based on the feed, orientation of the mailpiece when fed by the mailpiece feeder 38 for, transport by the mailpiece transporter 34. Orientation determination is further facilitated by providing scanners and/or sensors that compare the locations of stamp, return address, address, barcode and other characteristics of the mailpiece. The orientation determination for a particular mailpiece dictates not only how, where, and what size label and/or tab is applied but whether the mailpiece should be sorted to a bin prepared for special sorting.

As explained more fully below, the labeling function and the tabbing function of the labeler-tabber 50 can be actuated automatically upon the occurrence of a pre-selected condition or at the command of a user provided via the user interface 42.

As further illustrated in FIG. 1 the multitask mixed mailpiece processor and sorter 30 preferably also includes a printer 52 positioned downstream from the mailpiece combination labeler-tabber 50 and adjacent the mailpiece transporter 34. The printer 52 is able to print pre-selected indicia onto a label or a tab that has been applied by the combination labeler-tabber 50 to a mailpiece. Preferably, the printer 52 includes multi-line print head, as will be readily understood by those skilled in the art, to thereby facilitate single pass processing and sorting according to the present invention.

As further illustrated in FIG. 1 the multitask mixed mailpiece processor and sorter 30 also includes a plurality mailpiece sorting bins 54 positioned downstream from the printer 52 and adjacent the mailpiece transporter 34. Each mailpiece, once having been processed according to at least one of the multiple task procedures, is selectively and ultimately transported by the mailpiece transporter 34 to one of the plurality of mailpiece sorting bins 54. Preferably, the plurality of mailpiece sorting bins includes at least a reprocessing bin 56, out-of-zone bin 58, and carrier routing bin 60, each of which is designated for receiving specific mailpieces as explained below.

The multi-task mixed mailpiece processor and sorter 30, as illustrated in FIG. 1, also includes a process controller 62. The process controller 62 can be a specific-purpose circuit for carrying out processing and sorting tasks according to the present invention. Alternatively, as illustrated in FIG. 1, the process controller can be a general purpose computer on which specific software-contained instructions and data are loaded for carrying out the same processing and sorting tasks. Specifically, the general purpose computer, as will be readily understood by those skilled in the art, is a combination of central processing unit 64 and memory 66 linked by a bus 68. Whether embodied in a specific-circuit or general purpose programmable computer, the process controller 62 according to the present invention preferably includes an optical character reader 70 positioned in communication with the mailpiece transporter 34, mailpiece size determiner 38, mailpiece scanner 40, combination mailpiece labeler-tabber 50, printer 52, and user interface 42.

The multi-task mixed mailpiece processor and sorter 30 preferably also includes a combination labeler-tabber that is also positioned in communication with the mailpiece size determiner and is adapted to tab a first-sized mailpiece with a tab having a first size defining a first-sized tab and a second-sized mailpiece by a tab having a second size defining a second-sized tab in response to a mailpiece sized determination of the mailpiece size determiner. Preferably, the combination labeler-tabber 50 is adapted to tab a first-sized mailpiece with a tab having a first size defining a first-sized tab and a second-sized mailpiece by a tab having a second size defining a second-sized tab in response to a command provided by the user via the user interface.

The size determiner 38 preferably includes additional scanners and/or sensors, as will be understood by those skilled in the art, for determining varied physical properties of an individual mailpiece. These include but are not limited to overall mailpiece size, its length, and its width as well as other aspects such as thickness or even rigidity of the mailpiece. The labeler-tabber 50 preferably is responsive to size determinations by the size determiner 38 in causing the mailpiece to be labeled and/or tabbed with a size label and/or tab corresponding to the mailpiece size.

Figure 2:
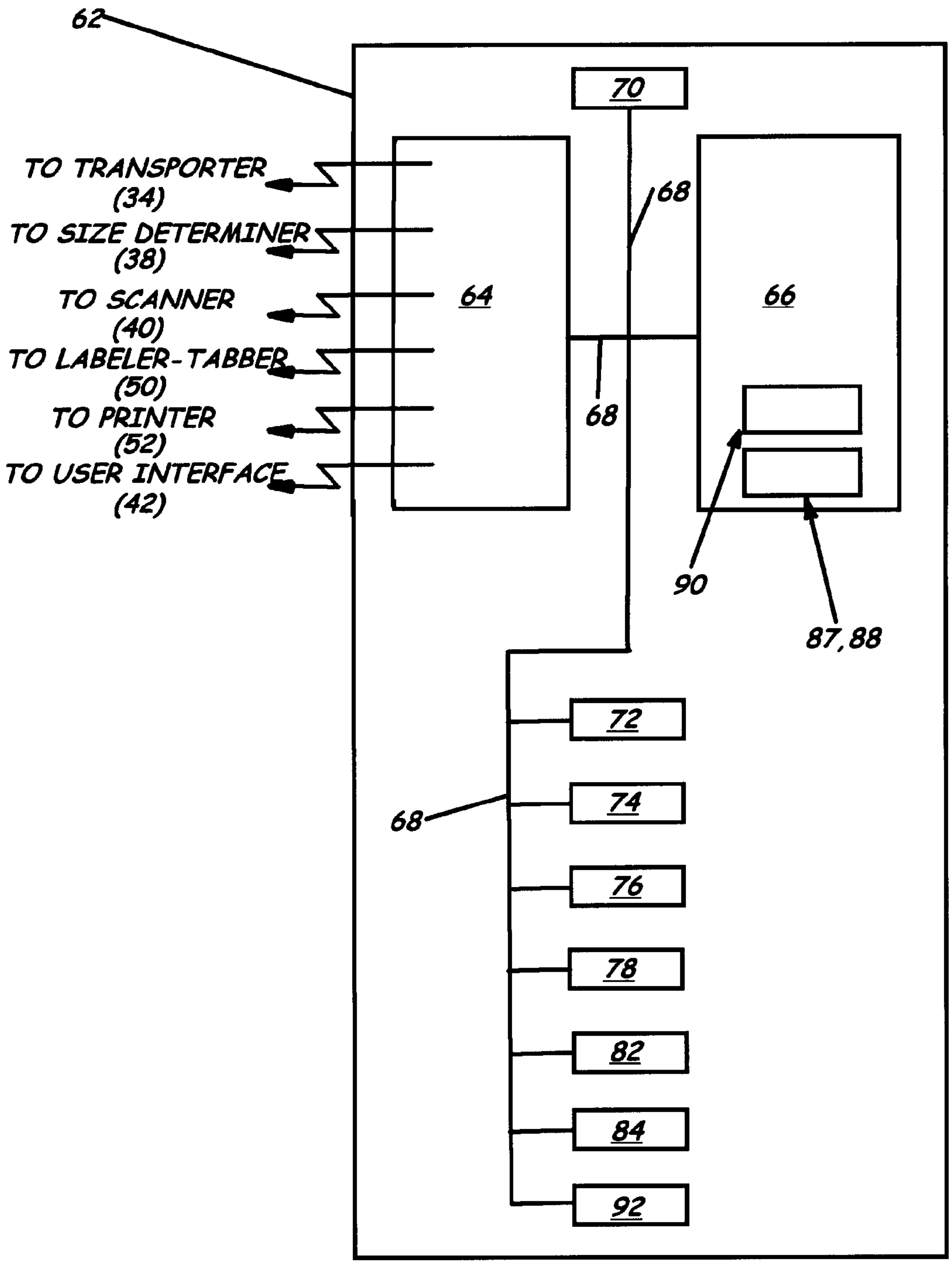
FIG. 2 is a schematic block diagram of a multitask mixed mailpiece processor and sorter according to the present invention.

As illustrated in FIG. 2, the process controller 62 includes a transport speed control processor 72 responsive to the mailpiece size determiner 38 to control the speed at which each mailpiece is transported by the mailpiece transporter 34. The purpose, according to the present invention, is to allow first-sized mail to be transported at a first speed and second-sized mail to be transported at a second speed so that differently sized mail can be efficiently processed mixed together on one apparatus rather than separately or on different apparatuses. The-'transport speed control processor 72 can itself be a task-designated circuit or, alternatively, a software program stored on a disk, magnetic tape, or optical storage medium (e.g., CD-ROM). The disk, magnetic tape, or optical storage medium each comprise a secondary memory that provides instructions to a main memory associated with a central processing unit (CPU). The instructions once loaded into main memory can be executed by the CPU as will be readily understood by those skilled in the art.

As also illustrated in FIG. 2, the control processor 62, according to the present invention, also includes a sorting processor 74, wherein the sorting processor 74 is responsive-to mail handling indicia scanned by the mailpiece scanner 40. In response thereto, if the mailpiece is devoid of at least one address indicator readable by the optical character reader, the sorting processor 74 will cause an image to be displayed on the visual display terminal 48 at the user interface 42. This enables a user to determine how the mailpiece lacking such indicia should be processed. In response to a user supplied command, the sorting processor 74 causes the printer 52 to print an indicator(e.g., an indicator code) on the mailpiece or, alternatively, the labeler-tabber applied label 50 to tag (e.g., ID tag) the mailpiece. Preferably, the sorting processor causes the printer to print an indicator code that indicates subsequent processing steps to be taken. If there is no place for printing the indicator on the mailpiece directly, the sorting processor 74 causes the labeler-tabber 50 to apply a label to the mailpiece and the printer 52 to print the indicator on the label.

The sorting processor 74 then causes the transporter 34 to transport the mailpiece for further processing. More preferably, the identification code is in the form of a bar code so as to be readily read by an optical scanner during further processing.

Alternatively, if there is indicia readable by the optical character reader 70, the sorting processor 74 preferably causes an address code to be printed on the mailpiece by the printer 52. If the address code is out-of-zone in the sense of being one not corresponding to the geographic zone within which the mailpiece is being processed, an identification code can be positioned on the mailpiece. In response to an identification code, the sorting processor 74 causes the mailpiece to be transported by the transporter to the out-of-zone bin 58. Otherwise, if there is indicia readable by the optical character reader 70 and the mailpiece is ready to be placed with carrier for delivery the mailpiece can be transported by the mailpiece transporter 34 to the carrier bin. If further processing is required, the sorting processor 74 can cause an indicator such as an appropriate address or indicator code to be printed on the mailpiece by the printer 52, after which the sorting processor 74 causes the mailpiece to be transported by the mailpiece transporter 34 to the carrier bin 60.

In addition, the sorting processor 74 preferably is also positioned to respond to mailpieces in which only a portion of the address indicators are viewable through a window of the mailpiece (i.e., a clear, see-through covering in the envelope intended to expose addressing indicia printed on an enclosed piece of mail). The sorting processor 74 responds by causing the printer 52 to print a post or code indicator on the mailpiece. Preferably, the indicator, such as a bar code, is an indicator that allows the subsequent processing of the mailpiece even though the windowed address indicator is only partially viewable.

As further illustrated in FIG. 2, the multitask mixed mailpiece processor and sorter 30 preferably also includes a return-to-sender processor 78 to process a mailpiece that is to be returned to the mailpiece sender. Specifically, the return-to-sender processor 78 is responsive to mail handling indicia scanned by the mailpiece scanner 40 so as to cause an address code to be printed on the mailpiece by the printer 52 wherein the address code corresponds to the address of the sender. If there is no place to print the indicator directly, the return-to-sender processor causes a label to affixed to the mailpiece by the labeler-tabber 50 and the printer 52 to print the address code on the label. The return-to-sender processor then causes the mailpiece to be transported by the transporter to the carrier bin 60. The return-to-sender processor 78 can be a designated circuit or a software program stored in a memory.

Specifically, the return-to-sender processor 78 processes images scanned by the scanner 40 by reading a return address positioned on a mailpiece. The return-to-sender processor 78 in response thereto causes the labeler-tabber 50 to apply a label to the mailpiece and print an indicator or postnet code on the label. Preferably, the code corresponds to the return address of the sender to whom the mailpiece is to be returned. More specifically, according to the present invention, the return-to-sender processor 78 preferably is positioned in communication with scanner 40 so that the return address can be an image (e.g. sender address) captured by the imager 40 during processing. The return address indicator 78 preferably is positioned also to cause the printer 52 to print on the mailpiece a postnet code corresponding to the return address.

Preferably, according to the present invention, a mailpiece to be returned to the mailpiece sender preferably has positioned thereon a return-to-sender indicator. The return-to-sender processor 78, then, is responsive to the return-to-sender indicator so as to identify the mailpiece as being a mailpiece that is to be returned to sender, causing an address code to be printed on the mailpiece by the printer 52 wherein the address code corresponds to the address of the sender. If no space is available to print directly onto the mailpiece, the return-to-sender processor 78 causes a label to affixed to the mailpiece by the labeler-tabber 50 on which the printer 52 prints the address code. Then the return-to-sender processor 78 causes the mailpiece to be transported by the transporter 34 to the carrier bin 60. The return-to-sender processor 78 can be either a circuit or software stored on a computer readable medium.

The sorting processor 74 has the capability to process images scanned by the mailpiece scanner 40. Such images include post and indicator codes. An example of such a code is the Planet bar code utilized by the USPS. The sorting processor 74 has the ability to determine whether such bar codes are correct, as for example whether a particular bar code corresponds to a particular address included among the mail handling indicia positioned on a mailpiece.

The sorting processor 74 also has the capability to process images scanned by the mailpiece scanner 40 so as to determine whether the scanned images correspond to one stored in the memory 66 of the process controller 62. If the images are identical, the sorting processor 74 causes a post or indicator to be printed by the printer 52 on the mailpiece or a label affixed by the combination labeler taber 50. The post or indicator, for example, can be a bar code corresponding to the return address of the mailpiece.

Further according to the present invention and as illustrated in FIGS. 1 and 2__, the multi-task mixed mailpiece processor and sorter 30 preferably also includes a dead-letter bin 80 and a dead-letter processor 82 as part of the process controller 62. The dead-letter processor 82, specifically, is responsive to mail handling indicia scanned by the mailpiece scanner to identify a mailpiece being undeliverable to an addresses and “un-returnable” to a sender. In response thereto, the dead-letter processor 82 causes the mailpiece to be transported by the mailpiece transporter to the dead-letter bin 80.

As further illustrated in FIG. 2, the multitask mixed mailpiece processor and sorter 30 preferably also includes an accountable mail processor 84 responsive to a postage-due indicator positioned on a mailpiece so as to identify a mailpiece for which a pre-selected amount of postage is due. In response thereto, the accountable mail processor 84 causes a postage-due marker to be printed by the printer 52 on the mailpiece or on a label affixed by the combination labeler-tabber 50 if no printing space is available on the mailpiece. The address code preferably corresponds to the address of the sender. The accountable mail processor 84 than causes the mailpiece to be transported by the transporter 34 to the carrier bin 60.

Preferably, according to the present invention, the accountable mail processor 82 is adapted to tabulate the postage due on each mailpiece. The result of the tabulation can then be written to the memory 66 of the process controller 62 so as to keep a record of charges for mail handling services performed by a user. The result so stored further can be printed on a separate print to produce a written record of the charges. The accountable mail processor 82, more generally, is responsive to a mark or an indicator, such as a bar code, positioned on the mailpiece and scanned by the scanner 40 indicating the amount of postage due. The accountable mail processor 82 responds by causing the printer 53 to print a post or indicator code on the mailpiece or a label affixed to the mailpiece by the labeler-tabber 50 so as to identify the mailpiece at the time of final sorting as a unique postage-due mailpiece. The accountable mail processor 82, too, can be a designated circuit or a software program stored in a memory.

As also illustrated in FIG. 2, the multi-task mixed mailpiece processor and sorter 30 preferably further includes a mis-sent letter processor 84 to assist in processing misdirected mailpieces as follows. If a mail piece has been previously processed and misdirected to an incorrect address, it will ordinarily be returned for subsequent processing. As a result of the earlier processing, the mailpiece handling indicia can include an earlier applied postnet code, the earlier applied postnet code defining a first postnet code. During subsequent processing a second postnet code can be applied, the subsequently applied postnet code defining a second postnet code. The mail handling indicia can further include a mis-sent letter indicator. As before mail-handling indicia is scanned by the mailpiece scanner 40. If the mailpiece is indicated as having been misdirected, the mis-sent letter processor 84 responds by comparing the second postnet code to the first code to determine whether the second postnet code is identical to the first code. If the codes are identical, the mis-sent letter processor 84 causes the mailpiece to be transported by the mailpiece transporter to a loop-mail bin 86 that is preferably include as one of the plurality of bins 54. The mis-sent letter processor 84 is either a circuit or memory-stored software.

Preferably, the memory 66 further includes a database 88 of address information to assist the user in identifying the address to which a particular mailpiece is to be directed indicators. More preferably, the database comprises a look-up address database 87 containing mailpiece recipient addresses. With the user interface 42 positioned in communication with the labeler-tabber 50 and the printer 52, the user is able to select a mailpiece recipient address from the look-up database and provide a command through the user interface 42 to cause the printer 52 to print on the mailpiece the mailpiece recipient address selected from the look-up database. If no space is available for printing directly on the mailpiece, the address is printed on a label affixed to the mailpiece by the labeler or combination labeler-tabber 50.

In addition, the memory 66 preferably includes a mailpiece status database 90 containing data indicators for mailpieces, the indicators corresponding to pre-selected status designators. Each status designator preferably designates the processing status of the corresponding mailpiece. The process controller 62, then, preferably further includes a mailpiece tracker processor 92 positioned in communication with the memory 66 and with the mailpiece scanner 40 to identify a status designator positioned on a mailpiece and to cause the printer 52 to print on the mailpiece or a label affixed by the labeler or labeler-tabber 50 a mailpiece tracking indicator when a mailpiece is processed by the multi-task mixed mailpiece processor and sorter 30.

The present invention further provides a method 100 of multi-task processing and sorting of mixed mailpieces. The method of performing multiple processing and sorting tasks applies to each of the individual mailpieces of a plurality of mixed mailpieces of different sizes including at least mailpieces of a first size defining first-sized mailpieces and mailpieces of a second size defining second-sized mailpieces, the method comprising.

Figure 3:
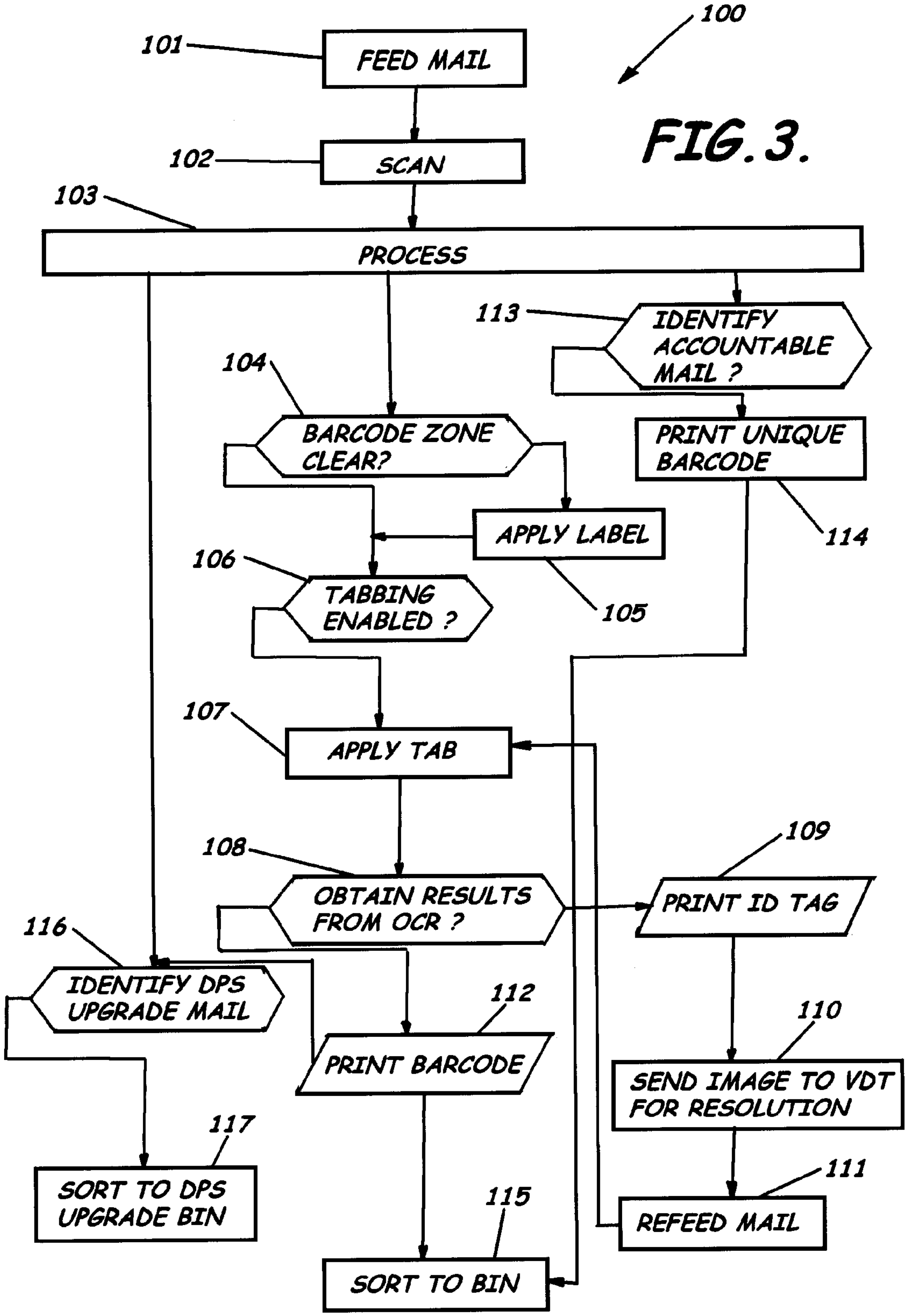
FIG. 3 is a flow diagram of a method of performing multiple processing and sorting procedures on mixed mailpieces according to the present invention.

As illustrated generally in FIG. 3 the method 100 entails determining from an electrical scan of each of the plurality of mailpieces whether one or more mailpieces lacks sufficient mail handling indicia positioned on the mailpieces for effecting delivery of each mailpiece to a correct mailpiece recipient. Preferably, each of the plurality of mixed mailpieces of varied sizes is fed using a mail feeder 32 to a mailpiece transporter 34. (BLOCK 101.) Each mailpiece preferably is scanned by a scanner 40 so as to allow mail handling indicia associated with each mailpiece to be optically read preferably by an optical character reader 70. (BLOCK 102.) If an individual mailpiece has sufficient mail handling indicia positioned on the mailpiece so that it is capable of being read electronically and enables the mailpiece to be correctly sorted the mailpiece is passed directly to a mail bin. (BLOCK 115.) If the mailpiece lacks sufficient mail handling indicia to effect delivery of the mailpiece to a correct mailpiece recipient, however, than a visual image is generated and the mailpiece is marked with an indicator code (e.g., ID tag). (BLOCKS 109 and 110). Thus, more generally according to the method 100 of the present invention, a mailpiece is marked with a postnet code when the mailpiece has positioned thereon an indicator code but not a postnet, code, the postnet code then corresponding to a mail handling indicator.

The mailpiece, preferably, is then re-fed for processing. (BLOCK 111.) The visual image is preferably displayed to a user-operator at a visual display terminal 48 of a user interface 42. The image can be used to determine the proper indicator code that should be printed on the mailpiece so as to allow the mailpiece during reprocessing to receive a postnet code (e.g., a bar code) corresponding to a correct delivery address. (BLOCK 112) Accordingly, the postnet code corresponding to a mail handling indicator provides an indicator on the basis of which the mailpiece can be properly sorted.

According to the present invention, if there is nowhere on the mailpiece that the postnet code can be appropriately printed, then a label will be applied. Preferably, the method incorporates the use of a combination labeler-tabber 50 so that if the mailpiece is open or otherwise unsealed, a tab along with or lieu of the label is applied. (BLOCKS 104–107.) The label or the tab then provides the surface upon which the indicator code can be printed.

As further illustrated in FIG. 3, the method 100 can be adapted to serve the needs of established postal services such as the USPS. Specifically, mail characteristics can be determined based on scanner and other sensors to determine the whether a particular mailpiece can be processed on high speed automated equipment as traditionally used, for example, with the USPS's Delivery Point Sequence processing. The determination, can be based on properties such as a adequate eleven digit postnet barcode, the overall mailpiece size, length and width, thickness, rigidity and by whether the mailpiece is sealed or tabbed. The method 100 according to the present invention specifically allows for identification and sorting of such DPS processed mailpieces. (BLOCKS 116 and 117.)

Figure 4:
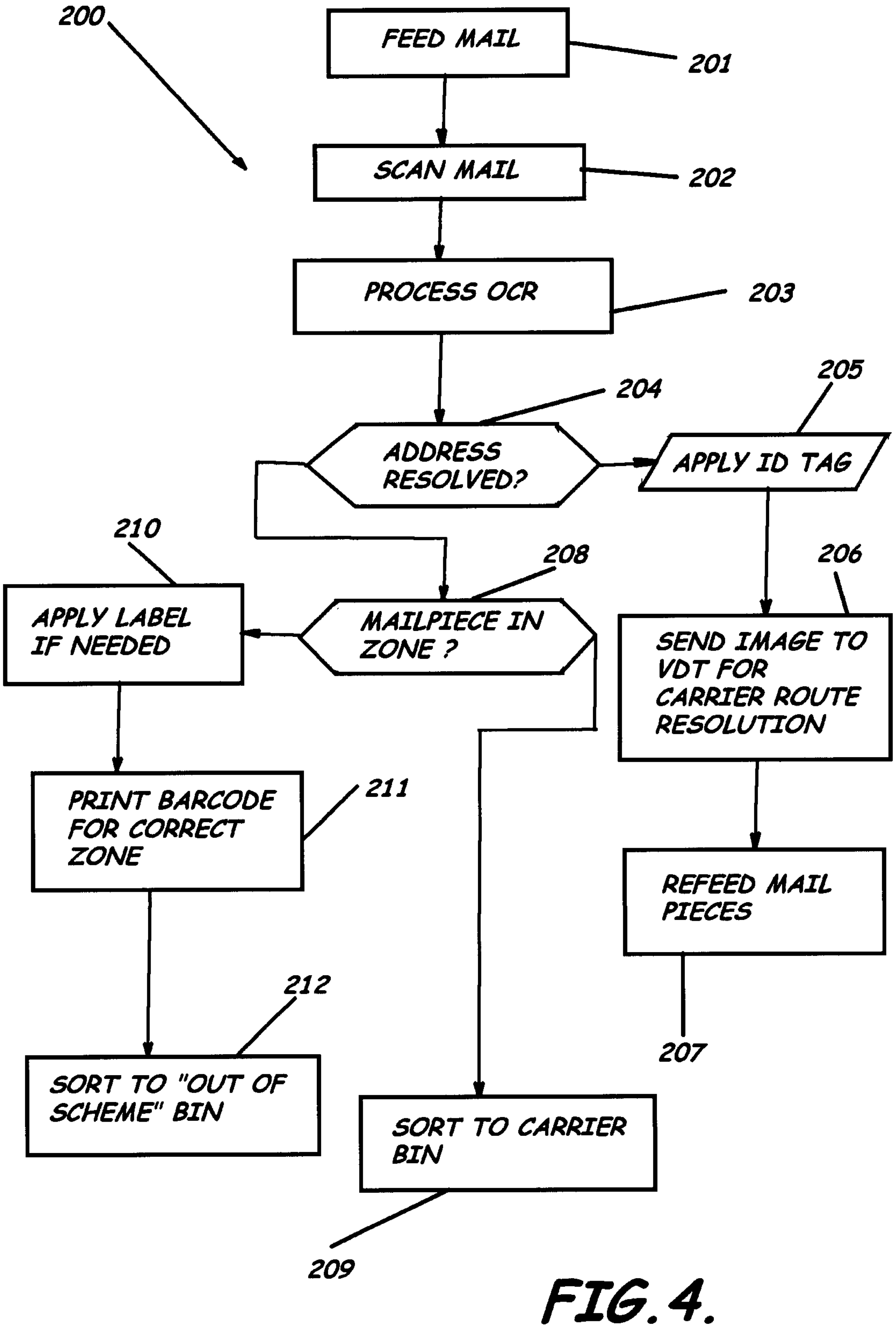
FIG. 4 is a flow diagram of a method of performing multiple processing and sorting procedures on mixed mailpieces according to the present invention.

A method of carrier route sorting of mailpieces 200 is illustrated more explicitly in FIG. 4. Again, each mailpiece is preferably fed to mailpiece transport 34 using a mailpiece feeder 32 to processing, after which each mailpiece is electronically scanned for mail handling indicia. (BLOCKS 201–204.) If the mailpiece is devoid of sufficiently readable or precise mail handling indicia, an indicator code (e.g., ID tag) is applied to the mailpiece based on commands entered by a user in response to what the visual image displayed on the visual display terminal 48 of the user interface 42 reveal. (BLOCKS 205 and 206.) Processing proceeds by re-feeding the mailpiece and applying a postnet code (e.g., bar code) based on the indicator code so that the mailpiece can be appropriately routed. (BLOCK 207–209.) Additionally, according to the method 200, the mailpiece can be routed to an out-of-scheme (Read reject) bin when the mailpiece has positioned thereon an out-of-zone address code, an out-of-zone address code being defined as one not corresponding to the geographic zone within which the mailpiece is being processed. An appropriate post indicator for the out-of-scheme (Read reject) mailpiece will be applied either directly to the mailpiece or on a label or tab applied to the mailpiece by the combination labeler-tabber 50 as described in detail above. (BLOCKS 210–212.)

Figure 5:
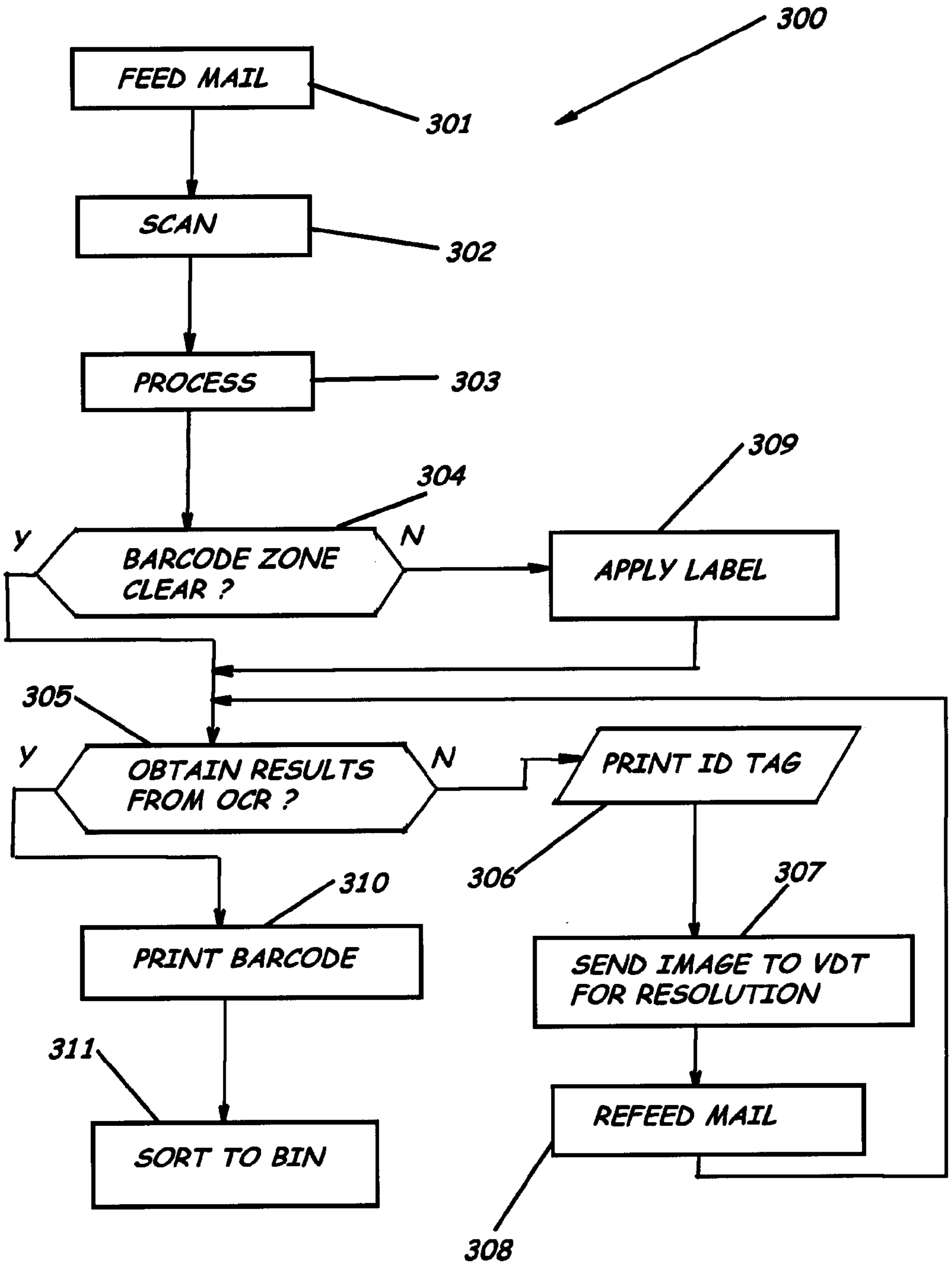
FIG. 5 is a flow diagram of a method of performing multiple processing and sorting procedures on mixed mailpieces according to the present invention.
Figure 6:
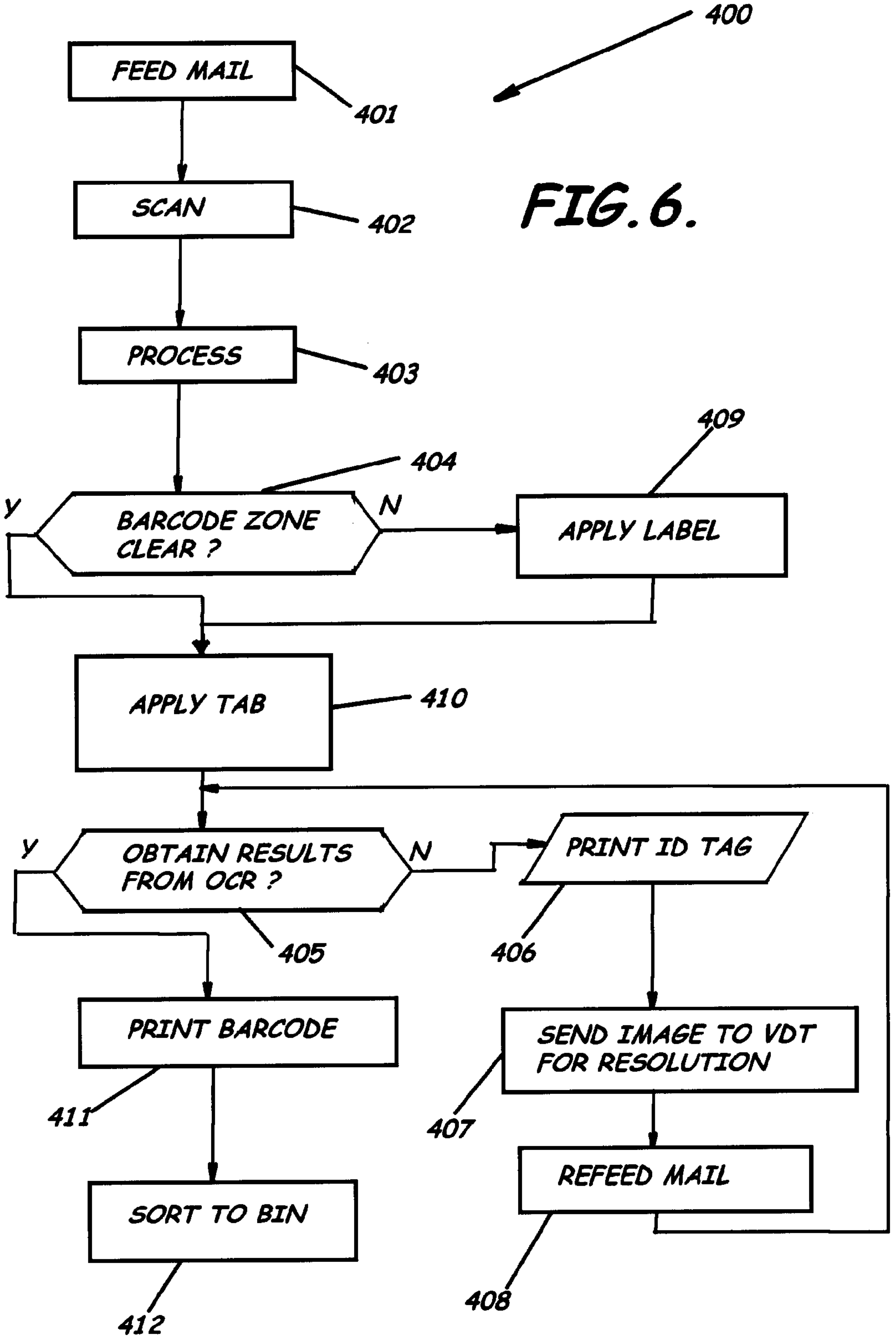
FIG. 6 is a flow diagram of a method of performing multiple processing and sorting procedures on mixed mailpieces according to the present invention.

The more general method 100 of performing multiple processing and sorting tasks on mixed mailpieces in a single pass preferably includes the related steps of labeling and sorting 300 as illustrated in FIG. 5. (BLOCKS 301–311.) More specifically, the method of labeling and sorting 300 permits a mailpiece to be labeled by a labeler-tabber 50 when the mailpiece is devoid of a clear zone for the printing of a postnet code or other mail handling indicia directly on the mailpiece.

The more general method 100 of performing multiple processing and sorting tasks on mixed mailpieces in a single pass further preferably also includes tabbing and sorting methods 400. (BLOCKS 401–412.) According to the tabbing and sorting method 400 of the present invention,-a mailpiece can be selectively tabbed with a combination labeler-tabber or just tabber in response to a command provided by the user via the user interface. Preferably, the tabbing and sorting method 400 further includes tabbing a first-sized mailpiece with a tab having a first size defining a first-sized tab and a tabbing a second-sized mailpiece by a tab having a second size defining a second-sized tab in response to a mailpiece size determination made by a least one sensor.

Figure 7:
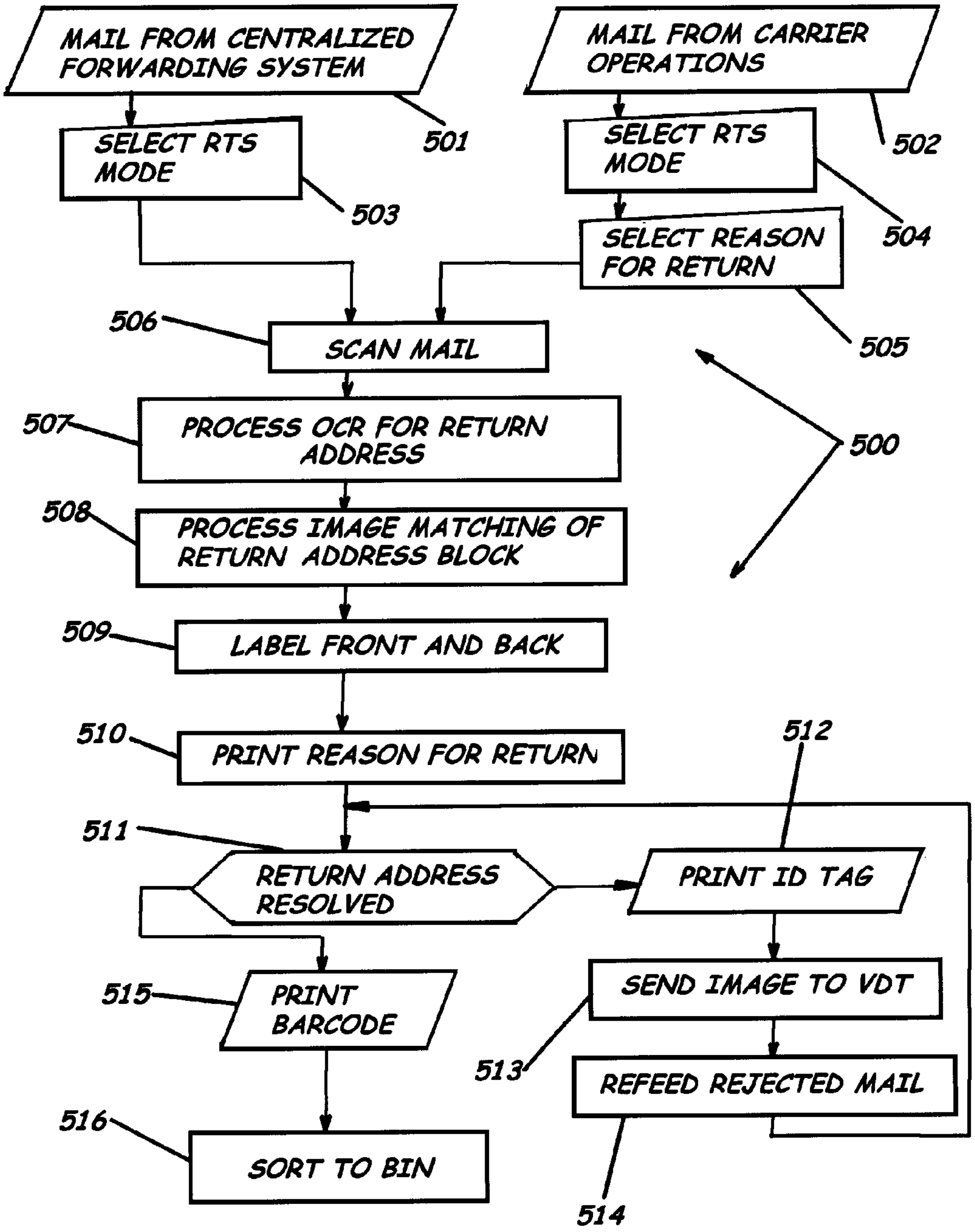
FIG. 7 is a flow diagram of a method of performing multiple processing and sorting procedures on mixed mailpieces according to the present invention.

According to the present invention, the general method 100 of performing multiple processing and sorting tasks in a single pass of mixed mailpieces preferably also includes a distinct method 500 of marking a mailpiece with an address code corresponding to the address of the sender and sorting the mailpiece to a carrier bin in response to a return-to-sender indicator positioned on the mailpiece. As illustrated in-FIG. 7, the method 500 comprises feeding mailpieces to a mailpiece transporter 34 from a mail feeder 32. Optionally, the mailpiece can be received directly through a centralized forwarding system such as used by the LISPS or from mail carriers. (BLOCKS 501 and 502.) Mail is electronically scanned to determine whether mail handling indicia readable by electronic means (e.g., using an optical character reader) is positioned on the mailpiece from which an image can be matched with a return address. (BLOCKS 506–508.) If not, an identification tag will be printed on the mailpiece or on a label or tag applied preferably by the combination labeler-tagger (BLOCKS 511–514.) Optionally, the mailpiece can be labeled or marked with a reason for the return.

In addition, the general method 100 of multiple task processing and sorting mixed mailpieces preferably also includes determining from the electrical scan whether at least two attempts have been made to deliver a mailpiece and sorting the mailpiece to a dead-letter bin when both deliveries were according to identical mail handling indicia applied to the mailpiece at different times.

Figure 8:
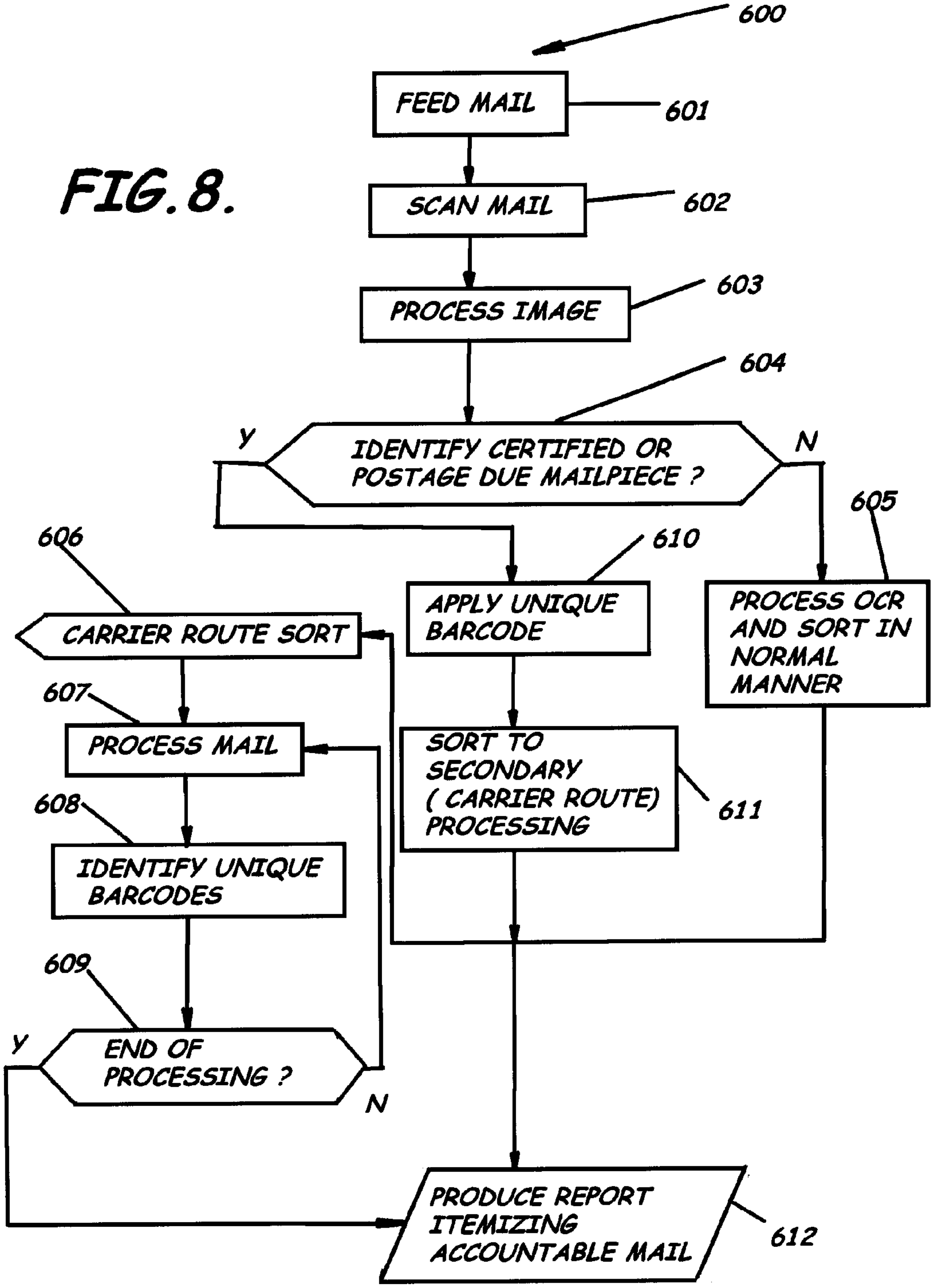
FIG. 8 is a flow diagram of a method of performing multiple processing and sorting procedures on mixed mailpieces according to the present invention.

Preferably, the general method 100 further includes tabulating the postage-due for each mailpiece having positioned thereon a postage due indicator. This distinct method of accountable processing 600 is illustrated in FIG. 8. As shown, the method specifically comprises feeding and scanning mailpieces as discussed above so as to generate and process electronic images, among which, depending on the particular mailpiece, may be a postage due indicator. (BLOCKS 601–603.) If the mail handling indicia does not include a postage due indicator, then the mail is process substantially as already described. (BLOCK 605–609.) Otherwise, a postage due indicator will be included among the mail handling indicia electronically scanned, prompting the printing of a post indicator (e.g., bar code corresponding to the amount due) on the mailpiece. (BLOCK 610.) Each mailpieces is uniquely routed according to whether or not a postage due indicator is positioned on the mailpiece, and finally an itemized report is generated. (BLOCK 612.)

Figure 9:
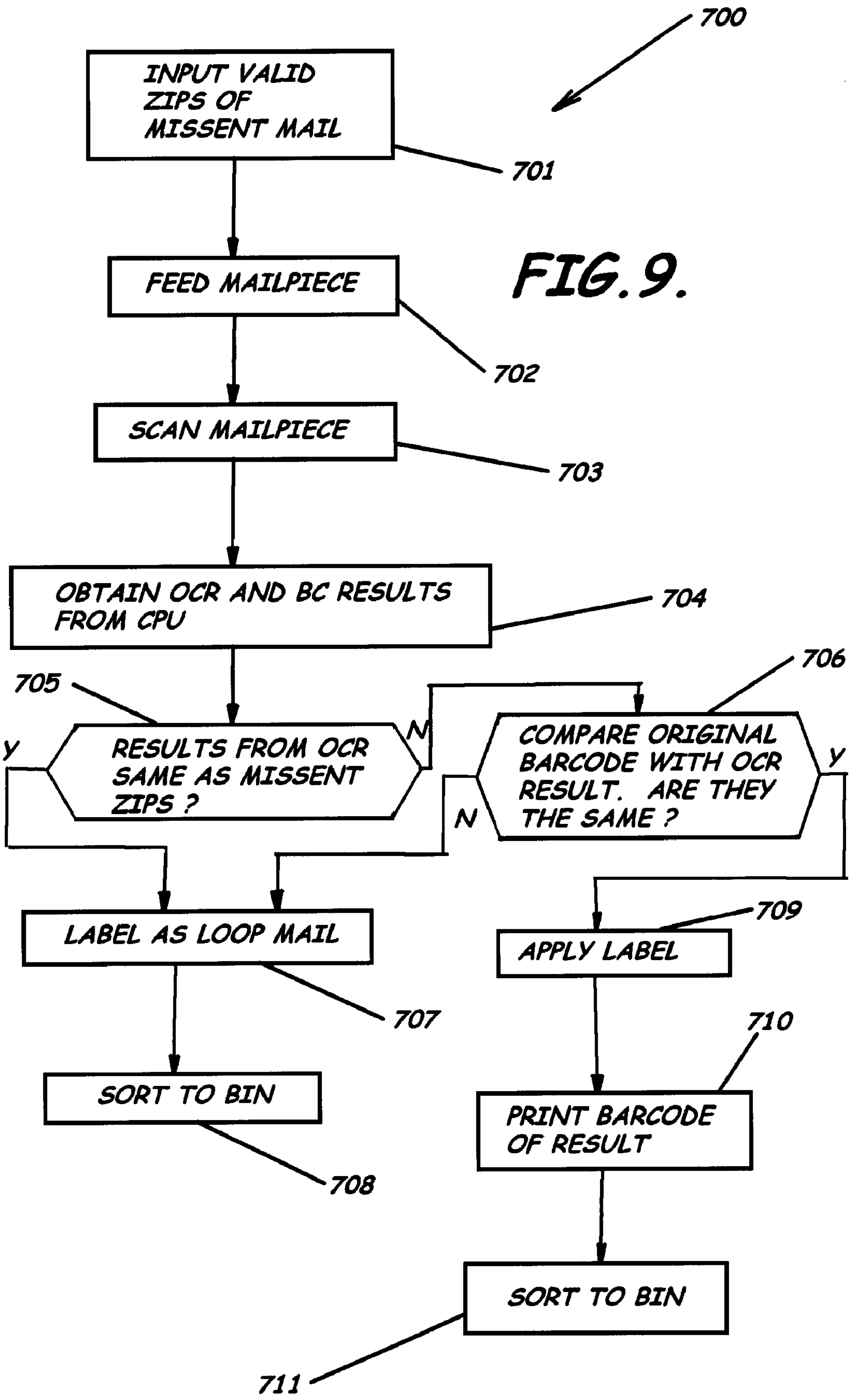
FIG. 9 is a flow diagram of a method of performing multiple processing and sorting procedures on mixed mailpieces according to the present invention.

The general method 100 preferably also includes detecting and correcting the misdirection of mailpieces. This distinct method of processing misdirected mail 700 is illustrated in FIG. 9. Again, mailpieces are feed and scanned substantially as already described. (BLOCKS 702 and 703.) The method 700, moreover, includes comparing an earlier applied postnet code defining the first postnet code with subsequently applied postnet code defining a second postnet code to determine whether the second postnet code is substantially the same as the first code. (BLOCK 705.) According to the method 700 of the present invention, if the second post code and the first post code are substantially the same, then the mailpiece is transported preferably by the mailpiece transporter to a loop-mail bin. Otherwise the mailpiece is processed substantially as other mailpieces as already discussed.

Figure 10:
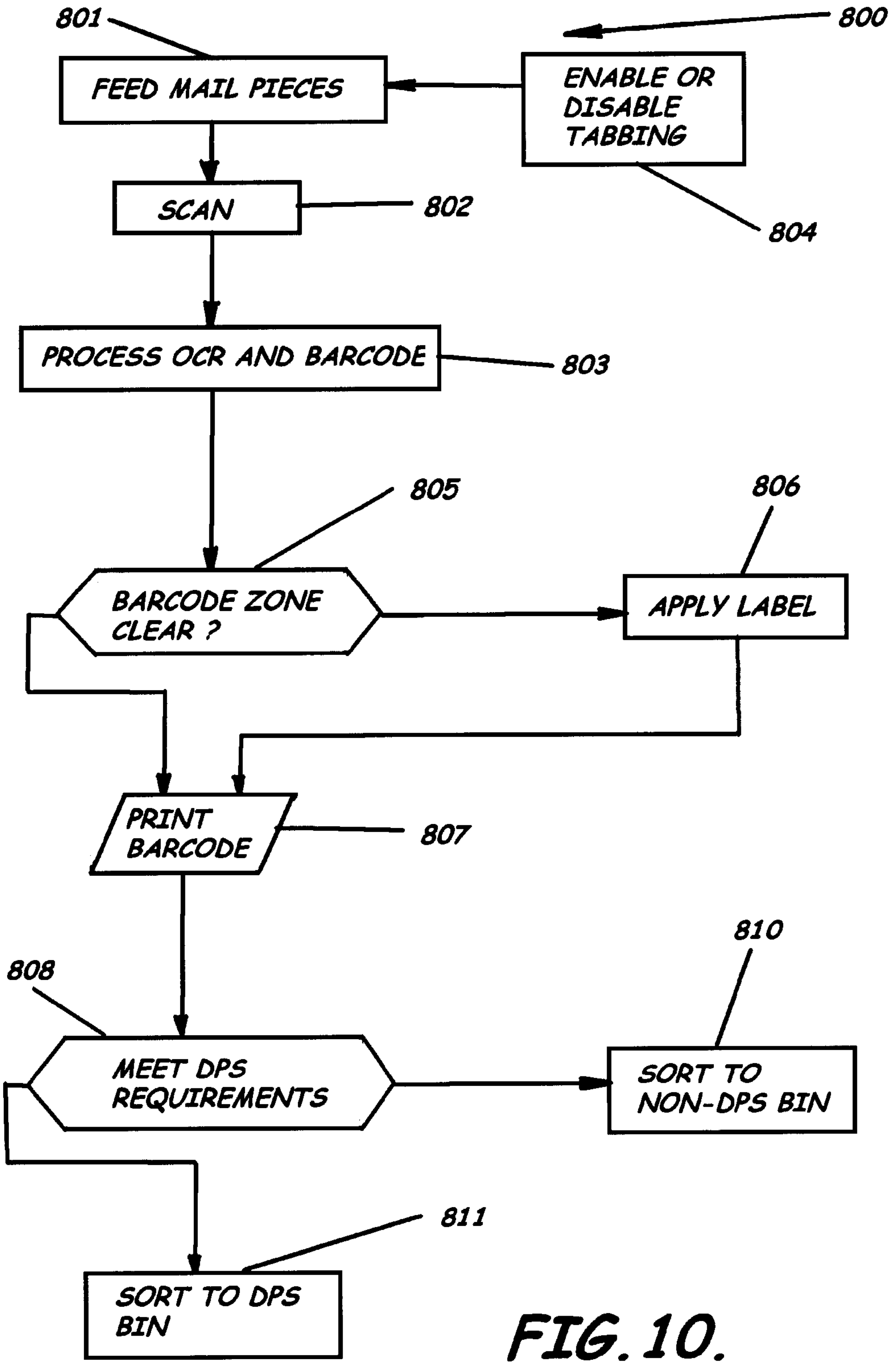
FIG. 10 is a flow diagram of a method of performing multiple processing and sorting procedures on mixed mailpieces according to the present invention.

FIG. 10 illustrates a distinct method of processing and sorting mailpieces having special characteristics that preclude their processing and sorting with other mixed mailpieces. Such mailpieces include bulky mail and so-called “riff-raff” mail as well as mailpieces otherwise requiring some type of pre-processing. The common cardboard tube mailpiece commonly used to mail out items (e.g., a magazine, certificate, or diploma) that are rolled-up and inserted into the tube for mailing is an example of such a mailpiece. As shown in FIG. 10, the method 800 preferably includes feeding each of a plurality of mailpieces via a mailpiece feeder 32 to a mailpiece transporter 34 that transports each mailpiece along a path of travel 36 during which each is scanned by a scanner 40. (BLOCKS 801 and 802.) Each mailpiece is scanned and, more preferably, mail handling indicia associated with the mailpiece is read by an optical character reader 70. As already described, an identification or postnet code (e.g., bar code) is applied as necessary to facilitate sorting of the mailpiece. (BLOCK 803.) Any of the mailpieces that are open or unsealed can be tabbed by enabling a tabber, preferably a combination labeler-tabber 50. (BLOCK 804.)

The method 800 concludes with the proper sorting of each mailpiece. More specifically, as explicitly illustrated in FIG. 10, the method 800 can be adapted so as to accommodate various mail handling systems like the Delivery Point Sequence processing system of the USPS. For example, as each mailpiece is fed by the mailpiece feeder, separate sensors can be used to determine the characteristics of each mailpiece as described above. Characteristics such as the overall mailpiece size, its length and width, thickness, rigidity, or other characteristics thus can be determined. Depending on the particular characteristics a determination can be made as to whether a mailpiece meets system standards such as whether, for example, it meets Delivery Point Sequence requirements. (BLOCK 808.) If not, it is appropriately sorted to a non-Delivery Point Sequence bin. (BLOCK 809.) Otherwise it is sorted as with other mail meeting the appropriate requirements. (BLOCK 810.) To further facilitate sorting, an indicator (e.g., bar code) can be printed on the mailpiece directly (or on a label or tab applied by a tabber or the combination labeler-tabber 50) after the initial sensor-facilitated determination is made as to whether the particular mailpiece meets a system's requirements. (BLOCK 110.)

As already noted the apparatus 30 and methods of the present invention permit each of the steps of multiple processing and sorting tasks to be performed at a first speed for first-sized mailpieces (e.g., letter-sized mailpieces) and at a second speed for second-sized mailpieces (e.g., flat-sized mailpieces) so that the plurality of mailpieces including both first- and second-sized mailpieces is processed and sorted in a single pass. Accordingly, a mixed mailpieces need not be segregated into same-size groups. The same methods can be performed on the same apparatus (described above) in a single pass rather than on different machines or in separate, distinct passes.

Thus, rather than require a mail handling facility to contain multiple machines arrayed at disparate locations throughout the facilities processing area, a single apparatus 30 may be utilized for accomplishing the various methods 100 according the present invention. Moreover, there is no need to run one pass with a same-size group and then stop the apparatus and re-tool before processing and sorting another same-size group of mailpieces. This single pass, single user method 100 and apparatus provides major advantages. Among these is the reduced footprint of processing and sorting equipment on the work area floor. Another is the elimination of downtime while an apparatus is re-tooled for processing different functions. Moreover, by reducing the necessary operators to as few as a single user, there are accordingly great savings in terms of labor expenses.

In the drawings-and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

What is claimed is:

1. A multi-task mixed mailpiece processor and sorter for processing and sorting differently sized mailpieces at least some of which have an outer surface portion on which is positioned mail handling indicia, the system comprising:

a mailpiece feeder positioned to individually feed a plurality of mailpieces including at least mailpieces of a first size defining first-sized mailpieces and mailpieces of a second size defining second-sized mailpieces;

a variable-speed mailpiece transporter positioned to receive each of the plurality of mailpieces from the mailpiece feeder, to transport each received mailpiece therefrom along a predetermined path of travel, and to selectively transport some mailpieces at a first speed and other mailpieces at a second speed;

a mailpiece size determiner positioned adjacent the mailpiece feeder and mailpiece transporter to determine the size of each of the plurality of mailpieces;

a mailpiece scanner positioned downstream from the mailpiece feeder and adjacent the mailpiece transporter to scan each mailpiece for mail handling indicia positioned on each mailpiece;

a user interface including a visual display terminal in communication with the mailpiece scanner to permit the input of commands by a user and to provide to the user visual images of mail handling indicia positioned on the mailpieces;

a printer positioned downstream from the mailpiece scanner and adjacent the mailpiece transporter to print on a mailpiece;

at least one mailpiece sorting bin positioned downstream from the printer and adjacent the mailpiece transporter; and a process controller including optical character reader in communication with the mailpiece transporter, mailpiece size determiner, mailpiece scanner, printer, and user interface, the process controller having:

a transport speed control processor responsive to the mailpiece size determiner to control the speed at which each mailpiece is transported by the mailpiece transporter so that the first-sized mail is transported at a first speed and the second-sized mail is transported at a second speed, and a sorting processor responsive to mail handling indicia scanned by the mailpiece scanner so as to cause an image to be displayed on the visual display terminal and an identification code to be printed by the printer on a mailpiece when the mailpiece is devoid of at least one address indicator readable by the optical character reader, and to cause the printer to print a first preselected code on a mailpiece when a second preselected code is positioned on the mailpiece, and otherwise to cause the mailpiece to be transported to the at least one mailpiece sorting bin.

2. A multi-task mixed mailpiece processor and sorter as defined in claim 1, wherein the sorting processor is further responsive to mail handling indicia scanned by the mailpiece scanner so as to cause the mailpiece transporter to transport a mailpiece to the mailpiece feeder to be re-fed thereto for further processing when the second preselected code has been printed by the printer on the mailpiece but the first preselected code has not been printed by the printer on the mailpiece.

3. A multi-task mixed mailpiece processor and sorter as defined in claim 1, wherein the at least one sorting bin includes a sorting bin defining an out-of-scheme bin, and wherein the sorting processor is further responsive to mail handling indicia scanned by the mailpiece scanner so as to cause the printer to print a post code on a mailpiece and the mailpiece transporter to transport the mailpiece to the out-of-scheme bin when the mailpiece has positioned thereon an out-of-zone address code, an out-of-zone address code being defined as one not corresponding to the geographic zone within which the mailpiece is being processed.

4. A multi-task mixed mailpiece processor and sorter as defined in claim 1, wherein the process controller further includes a return-to-sender processor to process a mailpiece that is to be returned to the mailpiece sender, the return-to-sender being responsive to mail handling indicia scanned by the mailpiece scanner so as to cause an address code to be printed on the mailpiece by the printer wherein the address code corresponds to the address of the sender and the mailpiece to be transported by the transporter to the carrier bin.

5. A multi-task mixed mailpiece processor and sorter as defined in claim 1, wherein mailpiece handling indicia includes at least one of recipient address, sender address, identification code, a postnet code including an earlier applied post code defining a first postnet code, and a subsequently applied postnet code defining a second postnet code, and a mis-sent letter indicator, wherein the plurality of mailpiece sorting bins further includes a loop-mail bin, and wherein the process controller further includes a mis-sent letter processor responsive to mail handling indicia scanned by the mailpiece scanner to identify a mailpiece that previously was sent to an incorrect recipient address, to compare the second postnet code to the first code to determine whether the second postnet code is identical to the first code, and to cause the mailpiece to be transported by the mailpiece transporter to the loop-mail bin.

6. A multi-task mixed mailpiece processor and sorter as defined in claim 1, wherein the process controller further includes a memory including a look-up address database containing mailpiece recipient addresses, and wherein the user interface is positioned in communication with the printer to thereby enable the user to select a mailpiece recipient address contained in the look-up address database and to cause the printer to print on a label the mailpiece recipient address selected from the look-up database in response to a command provided by the user via the user interface.

7. A multi-task mixed mailpiece processor and sorter as defined in claim 1, wherein the process controller further includes a memory having a mailpiece status database containing data indicators for mailpieces and corresponding to pre-selected status designators, each status designator designating the processing status of the mailpiece, and wherein the process controller further includes a mailpiece tracker processor in communication with the memory and with the scanner to identify a status designator positioned on a mailpiece and to cause the labeler-tabber or like to apply a label to a mailpiece and the printer to print on the label a mailpiece tracking indicator when a mailpiece is processed by the multi-task mixed mailpiece processor and sorter.

8. A multi-task mixed mailpiece processor and sorter as defined in claim 1, further comprising a combination labeler and tabber in communication with the user interface and positioned downstream from the mailpiece scanner and adjacent the mailpiece transporter to selectively tab a mailpiece in response to a command provided by the user via the user interface and to label a mailpiece.

9. A computer program stored on a computer-readable medium to cooperatively control a mailpiece feeder, transporter, scanner, printer, and at least one mailpiece sorting bin for carrying out multi-task mixed mailpiece processing and sorting of differently sized mailpieces including letters and flats at least some of which have an outer surface portion on which is positioned mail handling indicia including at least one of recipient address, sender address, identification code, and postnet code, the program comprising:

- mailpiece transport speed control means at least one mailpiece size for controlling speeds at which each of a plurality of mixed mailpieces including at least mailpieces of a first size defining first-sized mailpieces and mailpieces of a second size defining second-sized mailpieces are transported, wherein the speed at which a mailpiece is transported being a function of physical dimensions of each mailpiece so that first-sized mail is transported at a first speed and second-sized mail is transported at a second speed;
- mail handling indicia reading means for reading at least one of recipient address, sender address, identification code, planetcode and postnet code positioned on each mailpiece;
- user interfacing means for allowing a user to receive at a visual display terminal a visual image of a mailpiece including mail handling indicia positioned on the mailpiece and for accepting the input of commands by the user;
- printer controlling means for controlling the printing of mail handling indicia on a mailpiece by the printer;
- mail processing and sorting means responsive to the mail handling indicia reading means for causing an image to be displayed on the visual display terminal and an identification code to be printed by the printer on a mailpiece when the mailpiece is devoid of at least one address indicator and for causing the printer to print a first selected code on a mailpiece when the identification code is positioned on the mailpiece, and otherwise for causing to cause the mailpiece to be transported by the mailpiece transporter to a carrier bin positioned to receive processed and sorted mailpieces.

10. A program as defined in claim 9, wherein the processing and sorting means is further responsive to mail handling indicia scanned by the mailpiece scanner so as to cause the mailpiece transporter to transport a mailpiece to the mailpiece feeder to be re-fed thereto for further processing when an indicator code has been printed by the printer on the mailpiece but a postnet code has not been printed by the printer on the mailpiece.

11. A program as defined in claim 10, wherein the processing and sorting means is further responsive to mail handling indicia scanned by the mailpiece scanner so as to cause the printer to print a postnet code on a mailpiece and the mailpiece transporter to transport the mailpiece to an at least one sorting bin defining an out-of-scheme bin when the mailpiece has positioned thereon an out-of-zone address code, an out-of-zone address code being defined as one not corresponding to the geographic zone within which the mailpiece is being processed.

12. A program as defined in claim 11, wherein the processing and sorting means further includes return-to-sender processing means to process mailpiece that is to be returned to the mailpiece sender, the return-to-sender being responsive to mail handling indicia scanned by the mailpiece scanner so as to cause an address code to be printed on the mailpiece by the printer, and wherein the address code corresponds to the address of the sender and the mailpiece to be transported by the transporter to the carrier bin.

13. A program as defined in claim 12, wherein the processing and sorting means further includes address database look-up means for looking up addresses stored in a memory, the address database containing mailpiece recipient addresses to thereby enable the user using the user interface to select a mailpiece recipient address contained in the address database and to cause the printer to print on the mailpiece the mailpiece recipient address selected from the look-up database in response to a command provided by the user via the user interface.

14. A program as defined in claim 9, further comprising combination labeler-tabber control means to control a labeler and a tabber to selectively tab a mailpiece in response to a command provided by the user via the user interface and to label a mailpiece.

15. A method of performing multiple processing and sorting tasks on individual mailpieces of a plurality of mixed mailpieces of different sizes including at least mailpieces of a first size defining first-sized mailpieces and mailpieces of a second size defining second-sized mailpieces, the method comprising:

- determining from each of the plurality of mailpieces whether one or more mailpieces lacks sufficient mail handling indicia positioned on the mailpieces for effecting delivery of each mailpiece to a correct mailpiece recipient;
- generating a visual image of a mailpiece when the mailpiece lacks sufficient mail handling indicia positioned thereon for effecting delivery of the mailpiece to a correct mailpiece recipient; and
- marking a mailpiece with an indicator code when the mailpiece lacks sufficient mail handling indicia positioned thereon for effecting delivery of the mailpiece to a correct mailpiece recipient, each of the steps of determining and marking the method being performed at a first speed for first-sized mailpieces and at a second speed for second-sized mailpieces.

16. A method as defined in claim 15, further comprising sorting a mailpiece to an out-of-scheme bin when the mailpiece has positioned thereon an out-of-zone address code, an out-of-zone address code being defined as one not corresponding to the geographic zone within which the mailpiece is being processed.

17. A method as defined in claim 15, wherein mailpiece handling indicia further includes an earlier applied post code defining a first postnet code, a subsequently applied postnet code defining a second postnet code, and a mis-sent letter indicator, and wherein the method further comprises comparing the second postnet code to the first code to determine whether the second post code is substantially the same as the first code, and to cause the mailpiece to be transported by the mailpiece transporter to a loop-mail bin when the first and second codes are substantially the same.

18. A method as defined in claim 15, further comprising selectively tabbing a mailpiece in response to a command provided by the user via the user interface.

19. A method as defined in claim 18, further comprising selectively labeling a mailpiece when the mailpiece is devoid of a clear zone for the printing of a post code on the mailpiece.

20. A method as defined in claim 19, further comprising tabbing a first--sized mailpiece with a tab having a first size defining a first-sized tab and a tabbing a second-sized mailpiece by a tab having a second size defining a second-sized tab in response to a mailpiece size determination made by at least one sensor.

* * * * *